(12) United States Patent
Hong et al.

(10) Patent No.: US 10,176,599 B2
(45) Date of Patent: Jan. 8, 2019

(54) ELECTRONIC APPARATUS AND DISPLAYING METHOD THEREOF

(71) Applicant: SAMSUNG ELECTRONICS CO., LTD., Suwon-si (KR)

(72) Inventors: Jin-hyuk Hong, Seoul (KR); Young-kwang Seo, Suwon-si (KR); Eun-seok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/603,709

(22) Filed: May 24, 2017

(65) Prior Publication Data

US 2018/0012379 A1 Jan. 11, 2018

(30) Foreign Application Priority Data

Jul. 6, 2016 (KR) .................. 10-2016-0085636

(51) Int. Cl.
*G09G 5/02* (2006.01)
*G06T 11/00* (2006.01)
*G06T 15/60* (2006.01)
*G06F 3/147* (2006.01)

(52) U.S. Cl.
CPC .......... *G06T 11/001* (2013.01); *G06F 3/147* (2013.01); *G06T 15/60* (2013.01); *G09G 5/02* (2013.01); *G06T 2215/16* (2013.01); *G09G 2360/144* (2013.01)

(58) Field of Classification Search
CPC ... G06T 11/001; G06T 15/60; G06T 2215/16; G09G 5/02; G09G 2360/144
See application file for complete search history.

(56) References Cited

U.S. PATENT DOCUMENTS

| 8,913,056 | B2* | 12/2014 | Zimmer | G06T 15/20 |
| | | | | 345/419 |
| 2002/0158872 | A1* | 10/2002 | Randel | G06T 15/405 |
| | | | | 345/426 |
| 2004/0098871 | A1 | 5/2004 | Waltho | |
| 2014/0092115 | A1 | 4/2014 | Mazzola | |
| 2014/0210822 | A1* | 7/2014 | Raley | G06T 15/80 |
| | | | | 345/426 |

FOREIGN PATENT DOCUMENTS

| KR | 10-2011-0053615 A | 5/2011 |
| KR | 10-2011-0055090 A | 5/2011 |
| KR | 10-2011-0077465 A | 7/2011 |
| KR | 10-1260326 B1 | 5/2013 |

* cited by examiner

*Primary Examiner* — Antonio A Caschera
(74) *Attorney, Agent, or Firm* — Sughrue Mion, PLLC

(57) ABSTRACT

A display apparatus and a displaying method thereof. The electronic apparatus includes a display, a bezel configured to house the display and includes a groove having designated size and depth, an image sensor configured to acquire an image of a shadow that is generated in the groove by light incident from outside, and a processor configured to control the display to display a graphic effect based on the shadow image acquired by the image sensor.

16 Claims, 13 Drawing Sheets

100

ELECTRONIC APPARATUS AND DISPLAYING METHOD THEREOF

CROSS-REFERENCE TO RELATED APPLICATIONS

This application claims priority from Korean Patent Application No. 10-2016-0085636, filed in the Korean Intellectual Property Office on Jul. 6, 2016, the disclosure of which is incorporated herein by reference in its entirety.

BACKGROUND

1. Field

Apparatuses and methods consistent with exemplary embodiments broadly relate to an electronic apparatus and a displaying method thereof, and more particularly, to an electronic apparatus which analyzes a direction of light and a characteristic of shadow by using an image sensor based on the shadow that is generated on the electronic apparatus according to an environment of ambient light and a displaying method thereof.

2. Description of the Related Art

With the development of the display apparatus technology, high-quality and thin televisions and monitors are becoming more prevalent. Accordingly, a demand for displaying additional various screen effects on a high-quality display apparatus has increased.

Specifically, a screen displaying effect can be provided by using relations between a display apparatus and a lighting environment thereof. A general existing screen displaying effect is controlling a level of brightness of a screen of a display apparatus by measuring a brightness level of outside around the display apparatus.

Therefore, when the existing screen displaying effect is provided based on the outside light around the display apparatus, a direction of the outside light is not sufficiently considered.

SUMMARY

Exemplary embodiments are related to an electronic apparatus which analyzes a direction of light and a shadow characteristic by an image sensor which acquires a shadow generated in a groove included in the electronic apparatus as an image and displays a graphic effect according to the shadow characteristic and a displaying method thereof.

According to an aspect of an exemplary embodiment, an electronic apparatus includes: a display; a bezel configured to house the display and include a groove having designated size and depth on an area; an image sensor configured to acquire an image of a shadow that is generated in the groove by light incident from outside; and a processor configured to control the display to display a graphic effect corresponding to the shadow image based on the shadow image acquired from the image sensor.

According to an aspect of another exemplary embodiment, a display method of an electronic apparatus includes: acquiring a shadow image which is generated by light incident on a groove having designated size and depth on an area of a bezel which houses a display of the electronic apparatus; and displaying a graphic effect corresponding to the shadow image based on the shadow image acquired in the acquiring.

According to the various exemplary embodiments, the electronic apparatus may determine a direction of light and a direction of a shadow by using an image sensor and a groove in which the shadow is generated which are included in the electronic apparatus without an additional sensor to determine a direction of ambient light and a direction of a shadow and thus, manufacturing cost may be saved. In addition, according to exemplary embodiments, the electronic apparatus may display various graphic effects according to a characteristic of a shadow by a direction of light.

BRIEF DESCRIPTION OF THE DRAWINGS

The above and other aspects of one or more exemplary embodiments will become more apparent by reference to exemplary embodiments thereof which are illustrated in the appended drawings. Understanding that these drawings depict only exemplary embodiments and are not therefore to be considered to be limiting of the scope of the disclosure, the principles herein are described and explained with additional specificity and detail through the use of the accompanying drawings, in which.

DETAILED DESCRIPTION OF THE EXEMPLARY EMBODIMENTS

Figure 1:
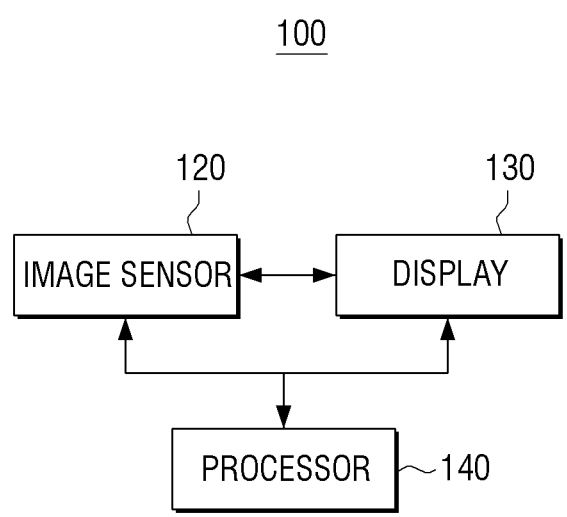
FIG. 1 is a block diagram illustrating a configuration of an electronic apparatus according to an exemplary embodiment.

Hereinafter, exemplary embodiments are described in detail with reference to the attached drawings. Further, the same reference numerals or symbols used in the drawings accompanied with the disclosure refer to components or elements that perform substantially the same functions.

The term such as "first" and "second" used in various example embodiments may modify various elements regardless of an order and/or importance of the corresponding elements, and does not limit the corresponding elements. The terms are used only for the purpose of distinguishing one element from another. For example, the "first" component may be named the "second" component, and vice versa, without departing from the scope of the present disclosure.

The term of "and/or" includes combination or one of a plurality of related items recited.

Terms used in the present disclosure are used only in order to describe specific embodiments rather than limiting the present disclosure. A singular expression includes a plural expression, unless otherwise specified.

The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof. The same reference numerals described in the attached drawings denote members that actually perform the same functions.

FIG. 1 is a block diagram illustrating a configuration of an electronic apparatus according to an exemplary embodiment.

FIG. 1 illustrates that an electronic apparatus includes an image sensor 120, a display 130 and a processor 140. In an exemplary embodiment, these components are each a hardware and may include software executed thereon.

The electronic apparatus 100 may be a display apparatus such as a TV, a mobile phone, a smartphone, a tablet PC, a laptop or the like. The examples of the electronic apparatus 100 only pertain to exemplary embodiments and it is not limited thereto.

The electronic apparatus 100 may include a bezel which houses around the display 130. The term "bezel" is used in exemplary embodiments. The bezel may be a frame which houses a partial area of the display or the entire boundaries of the display 130.

A groove having the designated size and depth may be formed on an area of a bezel.

The groove may consist of a bottom surface and a plurality of side surfaces having the designated depth according to a shape of the bottom surface. The bottom surface may be made of a semi-transparent film. For example, the bottom surface may be a polygon such as quadrangle, pentagon or hexagon, etc. or a circle.

The groove may be formed inside or outside the bezel. The shadow by the light incident from outside and by a side surface consisted of the groove may be generated on the bottom surface of the groove. Methods of generating shadows in the groove, according to an exemplary embodiment, are described hereinafter with respect to FIGS. 4A and 4B.

The image sensor 120 may be consisted in the electronic apparatus 100 by being spaced apart as much as a designated distance from the groove. The image sensor 120 may be spaced apart in parallel to the groove in a rear part. Herein, the image sensor 120 may acquire a shadow generated on the groove as an image.

The image sensor 120 may be disposed not parallel to the groove. Herein, a light guide plate may be spaced apart in parallel to the groove and in a rear part to reflect the light incident on the groove to the image sensor 120. According to a position of the image sensor 120 and a position of the groove, a position of a light guide plate may be determined by an angle of light of the light guide plate being calculated.

When a camera is included in the electronic apparatus 100, the shadow generated on the bottom surface of the groove may be acquired as an image by the camera. Herein, the camera may be spaced apart from the groove to capture the shadow that is generated on the bottom surface of the groove.

For the convenience of explanations, an exemplary embodiment that the image sensor 120 is spaced apart in parallel to the groove and in a rear part is described. However, it only pertains to an exemplary embodiment and is not limited thereto.

The display 130 may include various display panels such as a liquid crystal display (LCD), a thin-film-transistor liquid-crystal display (TFT-LCD), an organic light-emitting diode (OLED) and the like. The display 130 may display an image that the electronic apparatus 100 is to display.

The processor 140 may control the display 130 to display a graphic effect corresponding to a shadow image based on the shadow image acquired from the image sensor 120. For example, the processor 140 may render and display various graphic effects such as a shadow effect, a light effect on an image displayed on the display 130 based on shadow characteristics of a shadow image acquired from the image sensor 120.

The shadow characteristic may be a direction of light incident on the groove, an intensity of the light, a direction of the shadow according to the direction and the intensity of the light and the length of the shadow, etc. However, the shadow characteristic is not limited thereto and another characteristic may be further added.

The processor 140 may determine at least one of the aforementioned shadow characteristics based on the shadow image acquired from the image sensor 120.

The processor 140 may control the display 130 to display a shadow effect by rendering the shadow effect on an edge corresponding to a direction in which the light is incident among edges of the display by using at least one of the determined shadow characteristics.

For example, if an ambient light is in the upper left side (northwestward direction) of the display 130, the shadow by the left side surface and the upper side surface of the bottom surface may be generated on the bottom surface of the groove.

The processor 140 may control the display 130 to display a graphic effect by rendering the graphic effect on the left edge and the upper edge of the display 130 by determining at least one of the shadow characteristics based on the shadow image acquired from the image sensor 120.

The processor 140 may control the display 130 to display a shadow graphic effect on an object in an image displayed on the display 130 by determining the objet in the image displayed on the display 130 and determining at least one of the shadow characteristics based on the shadow image acquired from the image sensor 120.

The processor 140 may determine a contrast of light by determining a grayscale average value of pixels around right, left, upper and lower boundaries of the image on the bottom surface of the groove based on the shadow image acquired from the image sensor 120. Since the image sensor 120 consists of a plurality of pixels, the processor 140 may determine a contrast of each shadow area by calculating a grayscale average value of each pixel from the shadow image acquired from the image sensor 120. Methods of determining a grayscale average value are described with reference to FIG. 5.

Figure 2:
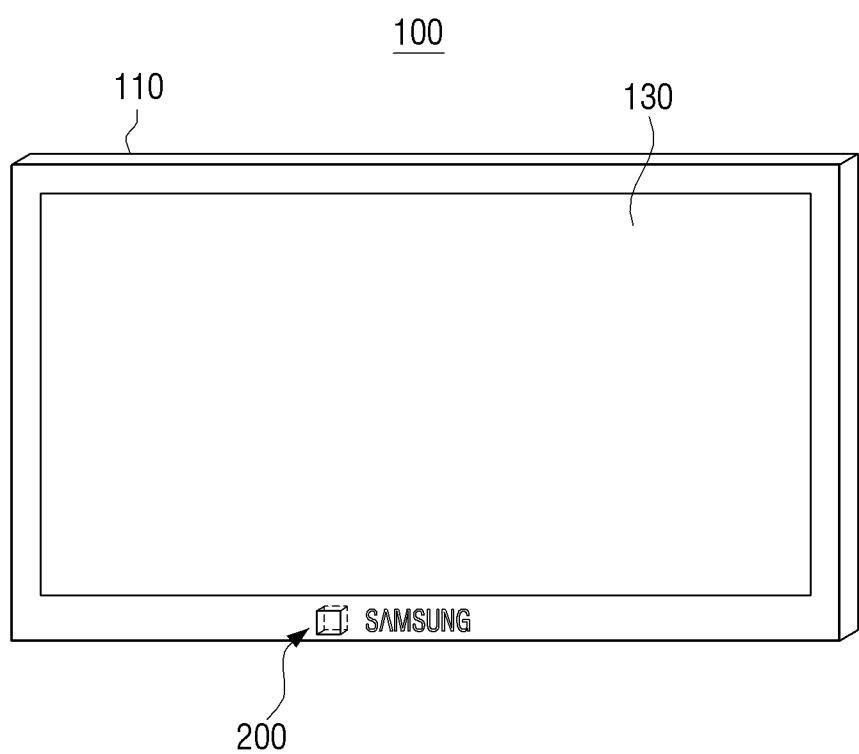
FIG. 2 is a front side perspective view illustrating an electronic apparatus according to an exemplary embodiment.

FIG. 2 is a front side perspective view illustrating an electronic apparatus according to an exemplary embodiment. FIG. 2 illustrates that the electronic apparatus 100 includes a bezel 110 which houses boundaries of the display 130 as described with reference to FIG. 1 according to an exemplary embodiment. The bezel 110 may include a groove 200 having designated size and depth (height).

FIG. 2 illustrates that the groove 200 is included in the front side of the bezel 110 but it is not limited thereto. For example, the groove 200 may be included in a rear part of the bezel 110. More than one groove may be included in or on the bezel 110. The groove 200 may be included in a pattern having an embossed part and/or an engraved part inside or outside of the bezel 110. For example, a logo (for example, SAMSUNG) of the electronic apparatus 100 may be included on a part of the display 130, with an embossed part and/or an engraved part. The logo (for example, SAMSUNG) may be disposed outside or inside the bezel 110. The groove 200 may be included in a portion which makes a step by an embossed part and/or an engraved part that the logo (for example, SAMSUNG) has. The shadow by ambient light may be generated in the groove 200.

As another example, the pattern (for example, SAMSUNG) of the electronic apparatus 100, itself, may be an integral groove having an embossed part and/or an engraved part. For example, each character of SAMSUNG may be an integral groove having an embossed part and/or an engraved part or at least one character of SAMSUNG may be an integral groove having an embossed part and/or an engraved part. When a plurality of patterns are realized as an integral groove, the electronic apparatus 100 may acquire a more exquisite shadow image corresponding to a light direction.

Figure 3A:
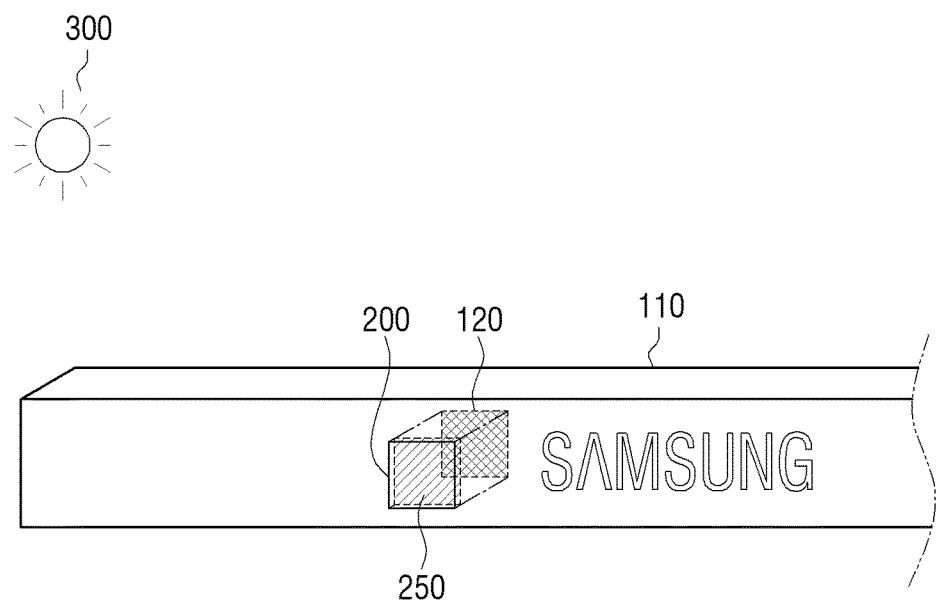
FIGS. 3A to 3C are a perspective view and sectional views, respectively, illustrating parts of an electronic apparatus according to exemplary embodiments.
Figure 3B:
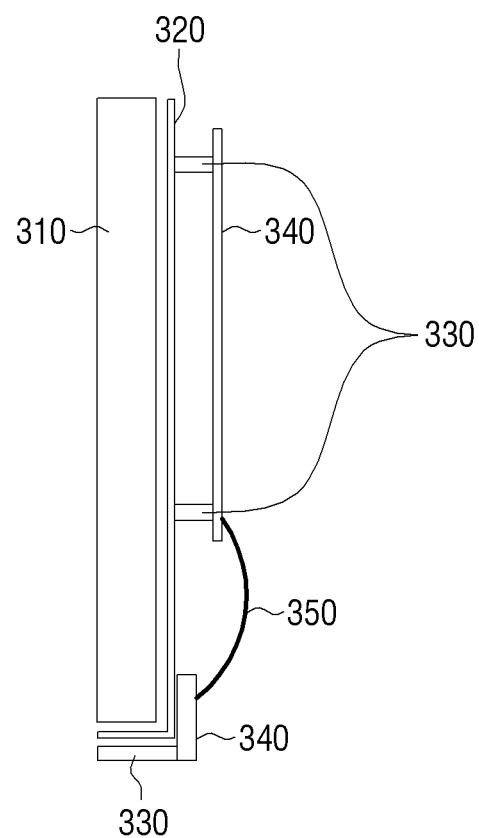
Figure 3C:
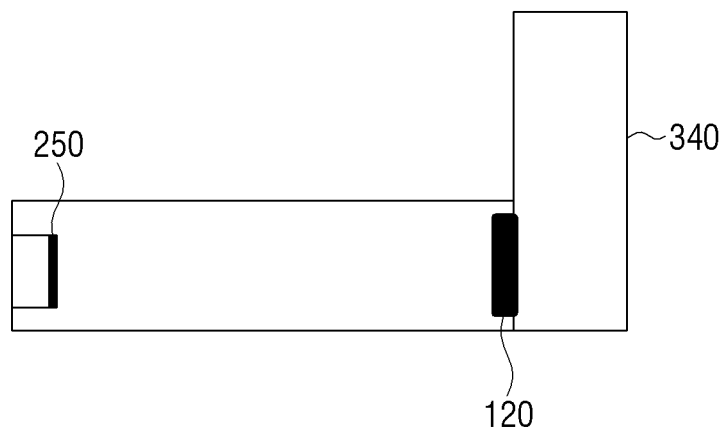

FIGS. 3A to 3C are a perspective view and sectional views illustrating parts of an electronic apparatus according to exemplary embodiments.

FIG. 3A is a perspective view of a bezel of the electronic apparatus 100 according to an exemplary embodiment. FIG. 3A illustrates that the groove 200 is included in an area of the bezel 110. The groove 200 may include a bottom surface 250 which is made of a semi-transparent film and a plurality of side surfaces according to a shape of the bottom surface 250. According to the exemplary embodiment, the groove 200 having the bottom surface 250 of a rectangle is illustrated but it is not limited thereto. The bottom surface 250 of the groove 200 may be various forms such as a circle, a triangle, a quadrangle, a pentagon, a hexagon and the like. Alternatively, the groove 200 may be a specific pattern having an embossed part and/or an engraved part rather than a circle or a polygon.

The bottom surface 250 of the groove 200 may be a semi-transparent film. A shadow may be generated on the semi-transparent film by a side surface of the groove 200. For example, the semi-transparent film may be a radial gradation film but it is not limited thereto.

The shadow may be generated on the bottom surface 250 of the groove 200 by the light incident from outside (for example, ambient light) 300.

For example, the length of the bottom surface 250 of the groove 200 may be 0.3 mm to 0.6 mm and the depth (height) of a side surface may be 0.5 mm to 1 mm. However, the length of the bottom surface 250 of the groove 200 and the depth surface of the side surface of the groove 200 only pertain to an exemplary embodiment and they are not limited thereto. The length and the depth may be variously modified and realized.

The image sensor 120 may be spaced apart in parallel to the groove 200 in a rear part. The image sensor 120 may acquire the shadow of a side surface of the groove 200 which is generated on the bottom surface 250 of the groove 200 by an ambient light 300 as an image. However, the image sensor 120 being spaced apart in parallel to the groove 200 and in a rear part is only an exemplary embodiment and it is not limited thereto.

As described with reference to FIG. 1, the image sensor 120 may be disposed at a different position rather than the rear part of the groove 200. Herein, a light guide plate (not illustrated) may be disposed in a rear part of the groove 200 to reflect the light incident through the bottom surface of the groove 200 and deliver the light to the image sensor 120. According to this, the image sensor 120 may acquire the shadow generated on the bottom surface 250 of the groove 200 as an image.

In addition, the electronic apparatus 100 including a camera may be realized for the camera to capture the shadow generated on the bottom surface 250 of the groove 200 as an image.

For example, the electronic apparatus 100 may be a smartphone including a camera. Herein, the groove 200 may be disposed around the camera and in the bezel which houses around the display of the smartphone. Alternatively, the groove 200 may be disposed in the pattern having an embossed part and/or an engraved part around the display of the smartphone. Herein, the electronic apparatus 100 may be realized for the camera to acquire a shadow image by capturing the shadow generated on the bottom surface 250 of the groove 200.

The groove 200, as described with reference to FIG. 2, may be realized to generate the shadow by the outside light 300 by being disposed in the pattern (for example, SAMSUNG) having an embossed part and/or an engraved part inside or outside the bezel 110 of the groove 200. The groove 200 may be realized as an integral form with the pattern (for example, SAMSUNG) having an embossed part and/or an engraved part.

A side surface of the groove 200 may have a specific pattern with an embossed part and/or an engraved part. Herein, the shadow generated on the bottom surface 250 of the groove 200 may have various shapes according to a pattern of the side surface.

FIG. 3B is a sectional view illustrating an electronic apparatus according to an exemplary embodiment. Referring to FIG. 3B, for example, the electronic apparatus 100 may be a TV including a display 310 such as an LED and an OLED. The electronic apparatus 100 may include a bottom chassis 320 which is heat conduction material. The bottom chassis 320 may support and accept the display 310 and make the heat radiate from the display 310 by diffusing the heat generated by the display 310. On the bottom chassis 320, a stud 330 may be fixed. The stud 330 may be formed with a screw thread and a part of the stud 330 may fix a print circuit board (PCB) 340. The print circuit board (PCB) 340 may be coupled with the stud 330. The print circuit board (PCB) 340 may be a main signal board in which various external input connectors and a CPU are included. A cable 350 may convert an image sensed by the image sensor illustrated in FIG. 3A into an electronic signal and transmit the electronic signal to the CPU of the main print circuit board (PCB) 340. The print circuit board 340 may include an image sensor but it only pertains to an exemplary embodiment and it is not limited thereto.

FIG. 3C is a sectional view illustrating the semi-transparent film 250 of the groove, the image sensor 120, and the print circuit board (PCB) 340 according to an exemplary embodiment. As illustrated in FIG. 3C, the image sensor 120 may be included in the print circuit board (PCB) 340 of the electronic apparatus 100. The image sensor 120 may be spaced apart in a rear part of the semi-transparent film 250 of the groove at a certain distance while being in parallel to the semi-transparent film 250. However, the image sensor 120 being spaced apart in a rear part of and in parallel to the semi-transparent film 250 of the groove only pertains to an exemplary embodiment and it is not limited thereto. The space between the semi-transparent film 250 of the groove and the image sensor 120 may be an empty space or the semi-transparent film 250 and the image sensor 120 may be connected by a light guide plate or an optical fiber.

Figure 4A:
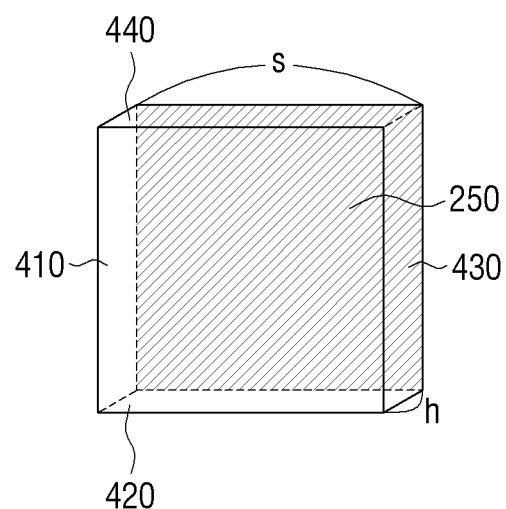
FIG. 4A is a perspective view illustrating a groove included in an electronic apparatus according to exemplary embodiment.

FIG. 4A is a front perspective view illustrating a groove included in an electronic apparatus according to exemplary embodiment.

FIG. 4A illustrates that the groove 200 has the bottom surface 250 with a designated size (s) and a plurality of side surfaces corresponding to the shape of the bottom surface 250, with a designated depth (height) (h). The size (s) and the depth (h) may be implemented by optimal lengths so that no noise occurs. For example, the size (s) may be 3 mm or more than 3 mm and 1 cm or less than 1 cm and the depth (h) may be 0.1 mm or more than 0.1 mm and 1 mm or less than 1 mm. The bottom surface may be a square or a rectangle. The bottom surface may be a circle or a polygon of another shape.

According to the environment of the light around the electronic apparatus 100 (the ambient light), the shadow of a side surface of the groove 200 may be generated on the bottom surface 250 of the groove. For example, if the light is incident from the left side of the groove 200, the shadow of the left side surface 410 of the groove may be generated on the bottom surface 250 of the groove. If the light is incident on the front surface of the groove 200, the shadow of the front surface 420 of the groove may be generated on the bottom surface 250 of the groove. If the light is incident from the back surface of the groove 200, the shadow of the back surface 440 of the groove may be generated on the bottom surface 250 of the groove. Therefore, the electronic apparatus 100 may determine a direction in which light is incident based on a shadow image which is generated on the bottom surface of the groove.

The described exemplary embodiment only pertains to an example. The shadow by the side surfaces 410, 420, 430, 440 may be variously generated on the bottom surface 250 of the groove according to a direction of the light.

Figure 4B:
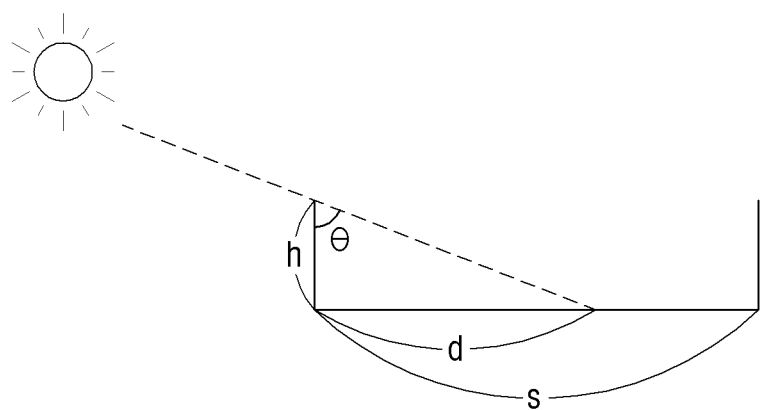
FIG. 4B is a view illustrating a method of generating a shadow in a groove according to an exemplary embodiment.

FIG. 4B is a view illustrating a method of generating a shadow in a groove according to an exemplary embodiment.

FIG. 4B illustrates that the length (d) of the shadow generated on the bottom surface (s) of the groove which is made of a semi-transparent film is determined by the depth (height) (h) of the groove and an angle of the light incident on a side surface of the groove. In other words, the length of the shadow that is generated on the bottom surface of the groove may be calculated by formula d=tan θ*h.

If the depth (h) of the side surface of the groove is fixed, the longer the length (d) of the shadow is, the bigger the incidence angle θ may be. In addition, the shorter the side surface of the groove is, the bigger the incidence angle θ may be. In other words, as the incidence angle θ becomes bigger, the shadow image acquired by an image sensor becomes larger and thus, the resolution of the shadow image may be increased. Therefore, the groove 200 having the optimal depth (h) to acquire the shadow image of the best resolution may be implemented.

Figure 5:
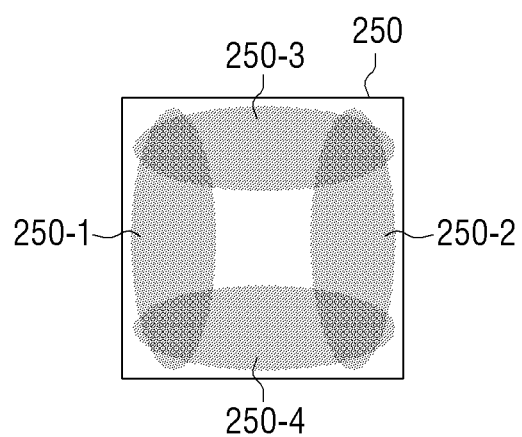
FIG. 5 is a view illustrating a method of an image sensor acquiring the shadow generated in a groove as an image according to an exemplary embodiment.

FIG. 5 is a view illustrating a method of an image sensor acquiring the shadow generated on a semi-transparent film on a groove as an image according to an exemplary embodiment.

As described with reference to FIG. 4A, each shadow of the side surfaces 410, 420, 430, 440 of the groove by the lights incident from outside is generated on the bottom surface 250 of the groove which is a semi-transparent film. Herein, shadow areas 250-1, 250-2, 250-3, 250-4 generated on the bottom surface 250 of the groove may be acquired as images by the image sensor. The image sensor may acquire the light passing through the semi-transparent film which the bottom surface 250 of the groove is made of as an image. Therefore, the image sensor may acquire the shadow images on the bottom surface 250 of the groove illustrated in FIG. 5. In other words, the image sensor may acquire the shadow area and the area with no shadow as one image.

As illustrated in FIG. 5, a contrast of the shadow on each pixel of the image sensor may differ according to a light direction and a shadow direction. Therefore, the processor 140 may calculate a grayscale average value of each pixel from the shadow image acquired from the image sensor and determine a contrast of each shadow area.

For example, if the light incident from the direction of the left side surface 410 of the groove illustrated in FIG. 4A, the shadow of the groove 200 may be the left shadow area 250-1 illustrated in FIG. 5. Herein, the left shadow area 250-1 may be darker than the upper shadow area 250-3 and the lower shadow area 250-4. In addition, the upper shadow area 250-3 and the lower shadow area 250-4 may be darker than the right shadow area 250-2. In other words, the left shadow area 250-1 which is generated on the side that the light is incident may be the darkest and the right shadow area 250-2 on the side opposite to the side that the light is incident may be the brightest. In other words, the grayscale average value of the left shadow area 250-1 pixel may be the highest and the grayscale average value of the right shadow area 250-2 pixel may be the lowest.

Therefore, the electronic apparatus 100 may determine the contrasts of the shadow areas based on the grayscale average value of each pixel around right, left, upper and lower boundaries of the shadow areas in the shadow image acquired from the image sensor.

In addition, the length of the shadow may differ according to the incidence angle described with reference to FIG. 4B. In addition, the incidence angle may vary according to the depth (h) of a groove. Therefore, the electronic apparatus 100 may determine the length of a shadow based on the shadow image acquire from the image sensor.

As described with reference to FIGS. 4A and 4B, the electronic apparatus 100 may determine an incident direction of light based on a shadow image acquired from the image sensor. Shadows may be generated by light from 360 degrees in the groove 200. Therefore, the electronic apparatus 100 may determine directions of the light from 360 degrees.

In addition, if side surfaces of the groove form a specific pattern including an embossed part and/or an engraved part, the shadow areas 250-1, 250-2, 250-3, 250-4 generated on the bottom surface 250 of the groove may vary according to the pattern. Therefore, the shadow image acquired from the image sensor may have a different grayscale value for each pixel according to the pattern which is made of the side surfaces of the groove 200.

Therefore, the image sensor may sense a shape of the bottom surface 250 of the groove, a shape of the shadow generated on the bottom surface 250 of the groove and a pattern by side surfaces of the groove, etc.

Figure 6A:
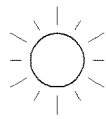
FIGS. 6A to 6C are views illustrating methods to display a graphic effect based on the shadow that is generated in a groove of an electronic apparatus according to exemplary embodiments.
Figure 6A:
Figure 6B:
Figure 6B:
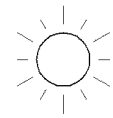
Figure 6C:
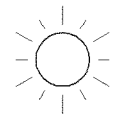
Figure 6C:
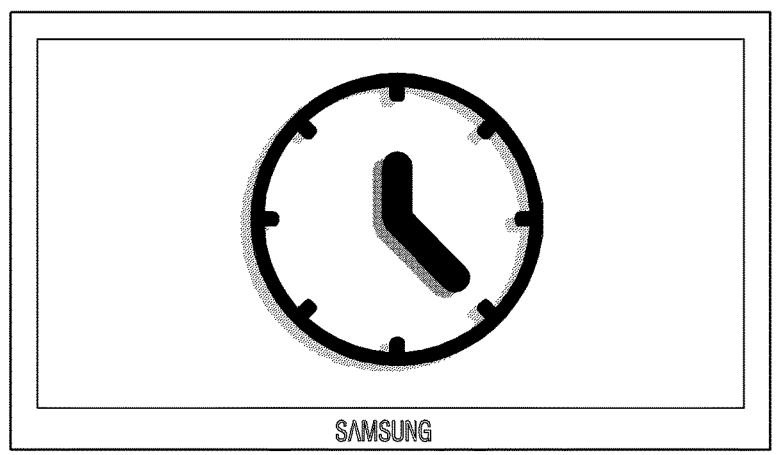

FIGS. 6A to 6C are views illustrating methods to display a graphic effect based on the shadow that is generated in a groove of an electronic apparatus according to exemplary embodiments.

Referring to FIGS. 6A and 6B, the electronic apparatus 100 may display an original image (for example, The World's Best SAMSUNG). According to an exemplary embodiment, the electronic apparatus 100 may render various graphic effects to the original image (for example, The World's Best SAMSUNG) by reflecting a characteristic of the shadow generated in the groove 200 according to a direction and an intensity of light and display the image.

According to an exemplary embodiment, the electronic apparatus 100 may render the shadow graphic effect to which shadow characteristics according to the outside lighting environment are reflected on the original image (for example, The World's Best SAMSUNG) and display the shadow graphic effect on the edges of the display. For example, if the shadow graphic effect to which the characteristics of shadow areas 250-1, 250-3 illustrated in FIG. 5 are reflected is rendered on the original image, the electronic apparatus 100 may display the shadow effect on the left and upper left edges which correspond to the direction in which the light is incident among the edges of the display as illustrated in FIG. 6A. In addition, if the shadow graphic effect to which the characteristics of shadow areas 250-2, 250-3 illustrated in FIG. 5 are reflected is rendered on the original image, the electronic apparatus 100 may display the shadow effect on the right and the upper edges which correspond to the direction in which the light is incident among the edges of the display as illustrated in FIG. 6B. If a shadow is not generated by light in the groove 200, the electronic apparatus 100 may process the original image to be darker and display the processed image. However, it only pertains to an exemplary embodiment and it is not limited thereto. In other words, the graphic effect reflecting the shadow characteristic may include various effects such as a steering effect, etc. in addition to the shadow effect.

As another exemplary embodiment, the electronic apparatus 100 may detect an object (for example, The World's Best SAMSUNG) included in an image. As illustrated in FIG. 6B, the electronic apparatus 100 may render the shadow graphic effect to which a shadow characteristic according to the outside lighting environment is reflected on the boundaries of the object included in the image. Therefore, the electronic apparatus 100 may provide the image with a three-dimensional (3D) effect.

FIG. 6C illustrates that a shadow graphic effect to which a shadow characteristic according to an outside lighting environment is reflected is rendered on edges of an object in an image according to an exemplary embodiment. As illustrated in FIG. 6C, the electronic apparatus 100 may detect the object (for example, a clock) included in the image. Herein, if the electronic apparatus 100 includes grooves having a plurality of embossed parts and/or engraved parts, the electronic apparatus 100 may acquire various shadow images which are generated through the multiple grooves according to a direction of light. Therefore, the electronic apparatus 100 may generate a more 3D shadow graphic effect based on the various shadow images.

FIG. 6C illustrates that a shadow graphic effect is rendered on a display such as a TV screen as an example but it is not limited thereto. In addition, FIGS. 6A to 6C illustrate that one object is displayed but it is not limited thereto. The electronic apparatus 100 may detect a plurality of objects included in an image and render a different shadow graphic effect on each object by using the shadow image generated by a groove.

The electronic apparatus 100 may control the display 130 to determine an object in an image displayed on the display 130 by the processor 140 illustrated in FIG. 1 and determine at least one among shadow characteristics based on the shadow image acquired from the image sensor 120 so that a shadow graphic effect is rendered on the object of the image displayed on the display 130.

If the electronic apparatus 100 includes a camera such as a smartphone, an electronic camera and the like, the electronic apparatus 100 may control exposure and luminance of the camera based on characteristics of the shadow generated by light and recognized in the groove.

Figure 7:
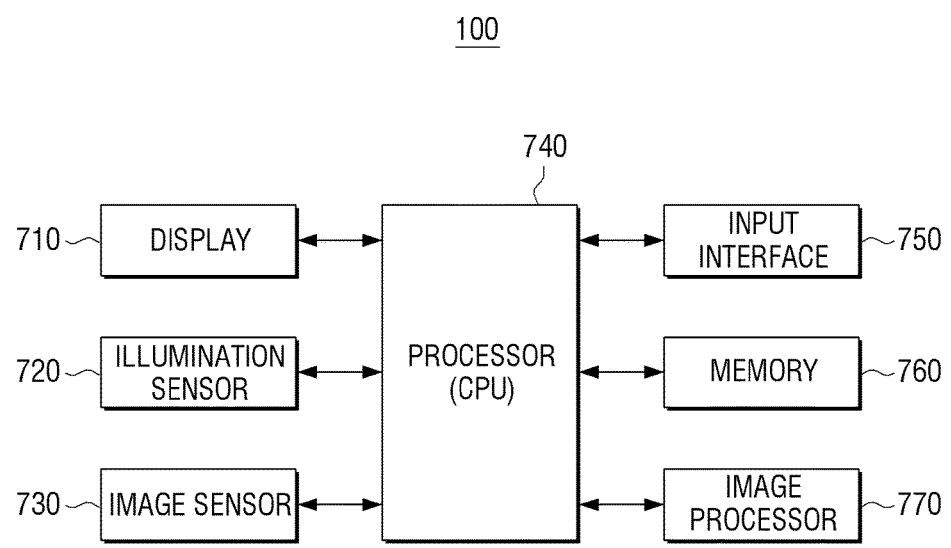
FIG. 7 is a detailed block diagram illustrating an electronic apparatus according to an exemplary embodiment.

FIG. 7 is a detailed block diagram of an electronic apparatus according to an exemplary embodiment. FIG. 7 illustrates that the electronic apparatus 100 includes a display 710, an illumination sensor 720, an image sensor 730, a processor 740, an input interface 750, a memory 760 and an image processor 770. Meanwhile, the configuration of the electronic apparatus 100 illustrated in FIG. 7 is merely one of exemplary embodiments, and may not be necessarily limited to the block diagram described above. Therefore, an element of the configuration illustrated in FIG. 7 may be omitted or modified or another element may be added according to a kind or a purpose of the electronic apparatus 100.

The display 710 may display an image. The display 710 may be realized as a Plasma Display Panel (PDP), a Liquid Crystal Display (LCD), an Organic Light Emitting Diode (OLED), a flexible display, a 3D display, or the like. The display 710 may be realized as a touch display.

The illumination sensor 720 may sense an amount of ambient light and transmit an electronic signal regarding the amount of the sensed light to the processor 740.

The image sensor 730 may sense the shadow penetrated on the bottom surface 250 of the groove 200 as an image. The image sensor 730 may be realized as a charge-coupled device (CCD) image sensor or a complementary metal-oxide semiconductor (CMOS) image sensor but it is not limited thereto. In addition, the image sensor 730 may sense the image penetrated through a lens of a camera (not illustrated) or a lens.

The processor 740 may control the overall operation of the electronic apparatus 100 by using various programs stored in the memory 760.

The processor 740 may include a RAM, a ROM, a graphic processor, a main CPU, a plurality of interfaces and a bus. Herein, the RAM, the ROM, the graphic processor, the main CPU and the plurality of interfaces may be connected to one another through the bus.

The RAM may store O/S and application programs. Specifically, as the electronic apparatus 100 boots, O/S may be stored in the RAM and various application data selected by a user may be stored in the RAM.

The ROM is configured to store an instruction set for system booting, and the like. When a turn-on command is input and power is supplied, the main CPU is configured to copy an OS stored in the memory 760 onto a RAM according to an instruction command stored in the ROM, and to boot a system by executing the OS. When the booting is complete, the main CPU is configured to copy various application programs stored in the storage 760 onto the RAM, and to perform various operations by executed the application programs copied onto the RAM.

The graphic processor may generate a screen including various objects such as an icon, an image, a text, etc. using a calculator and a renderer. Herein, the calculator may be configured to calculate attribute values such as coordinate values, shape, size or color in which each object will be displayed according to the layout of the screen by using the controlling command received from the illumination sensor 720 and the image sensor 730. Further, the renderer may be configured to generate various layouts of screens including objects based on the attribute values calculated at the calculator. The screen generated at the renderer may be displayed within the display area of the display 710.

The input interface 750 transmits a signal that a user inputs to the processor 740 or transmits a signal from the processor 740 to the user. For example, the input unit 750 may receive a user input signal or a control signal, such as power on/off, screen setting, or the like from a remote control device (not shown), and process the user input signal or the control signal or may process a control signal received from the processor 740 so as to transmit the control signal to the remote control device according to various types of communication methods such as Bluetooth, RFID, Infrared Data Association (IrDA), Ultra Wideband (UWB), Zigbee, and Digital Living Network Alliance (DLNA) communication methods, and the like.

The memory 760 may store various programs and data necessary for the operation of the electronic apparatus 100. The memory 760 may be implemented as a non-volatile memory, a volatile memory, a flash memory, a hard disk drive (HDD) or a solid state drive (SDD). The memory 760 may be accessed by the controller 740, and perform readout, recording, correction, deletion, update, and the like, on data by the controller 740. According to an exemplary embodiment, the term "memory" as used herein may include a memory 760, a ROM, and a RAM within the controller 740, or a memory card (not illustrated) mounted on the electronic apparatus 100 (e.g., micro SD card, memory stick).

Further, the memory 760 may store programs, data, and so on to constitute various screens to be displayed on the display area of the display 710.

The image processor 770 may perform various image processes such as decoding image data acquired from a camera or an image sensor, scaling, noise filtering, frame rate conversion, resolution conversion and the like.

Figure 8:
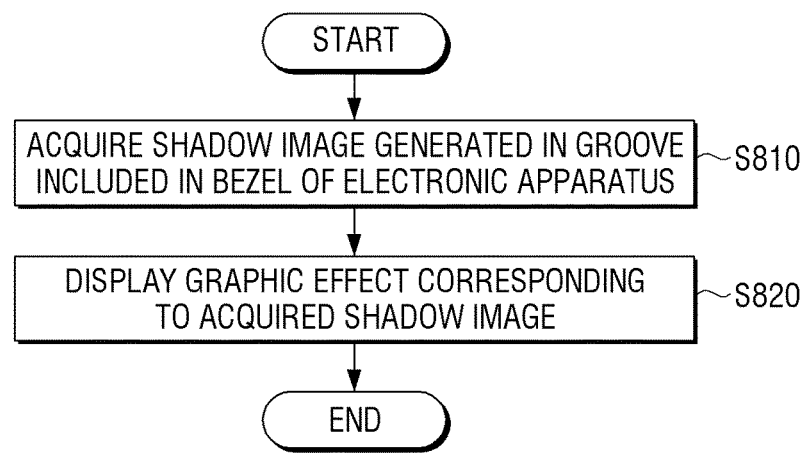
FIG. 8 is a flowchart illustrating a method of an electronic apparatus displaying a graphic effect based on the shadow that is generated on an electronic apparatus according to an exemplary embodiment.

FIG. 8 is a flowchart illustrating a method of an electronic apparatus displaying a graphic effect according to the shadow that is generated on an electronic apparatus according to an exemplary embodiment.

In S810, the electronic apparatus 100 may acquire an image of a shadow that is generated by light incident from outside in the groove included in a bezel which houses around of a display.

For example, when the light is incident to the electronic apparatus 100 by the light around the electronic apparatus 100, the groove may generate the shadow on the bottom surface of the groove by the incident light.

An image sensor or a camera of the electronic apparatus 100 may acquire the shadow generated on the bottom surface of the groove as a shadow image.

The electronic apparatus 100 may determine an intensity of light, a direction of the light, the length of shadow, a direction of the shadow, etc. based on the shadow image acquired by the image sensor or the camera. In addition, the electronic apparatus 100 may detect a shape of the bottom surface of the groove. The electronic apparatus 100 may sense a pattern of the groove based on the shadow image.

The electronic apparatus 100 may determine a contrast of each shadow area from the shadow areas in the shadow image by using a grayscale average value of each pixel of the image sensor.

Therefore, the electronic apparatus 100 may gain shadow characteristic values such as directions of a shadow and light, the length of the shadow, a contrast of each shadow area and the like, based on the shadow image.

In S820, the electronic apparatus 100 may display various graphic effects by using the shadow characteristics included in the shadow image. Methods of rendering and displaying various graphic effects are omitted since the methods of rendering and displaying various graphic effects are described with reference to FIGS. 6A and 6C.

According to the various exemplary embodiments, the electronic apparatus 100 may identify a shadow characteristic by the light by the front surface of the electronic apparatus 100 with a user as the center. The electronic apparatus 100 may provide a graphic effect realistic in view of a user by using shadow characteristics such as a direction of a shadow and light, the length of the shadow, a contrast of the shadow and the like.

The electronic apparatus 100 may measure a level of ambient brightness through an entire brightness analysis without an additional illumination sensor or a sensor for shadow sensing and shadow analysis and may analyze a shadow characteristic according to ambient brightness and a direction of light. Therefore, according to an exemplary embodiment, the electronic apparatus 100 may provide a realistic image to a user while saving manufacturing cost.

The methods according to one or more exemplary embodiments may be implemented as a program command type that may be performed through various computer units and may be recorded in a computer readable medium. The computer-readable medium may include a program command, a data file, a data structure or the like, alone or a combination thereof. For example, the computer-readable medium may be stored in a volatile or non-volatile storage device such as a ROM, a memory such as a RAM, a memory chip, and a device or an integrated circuit, or a storage medium which may be read with a machine (e.g., computer processing unit (CPU)) simultaneously with being optically or magnetically recorded like a CD, a DVD, a magnetic disk, a magnetic tape, or the like, regardless of whether it is deleted or again recorded.

The memory, which may be included in a mobile terminal, may be one example of a storage medium which may be read with programs including instructions implementing the exemplary embodiments or a machine appropriate to store the programs. The program commands recorded in the computer-readable medium may be designed for the exemplary embodiments or be known to those skilled in a field of computer software.

Although exemplary embodiments have been disclosed for illustrative purposes, those skilled in the art will appreciate that various modifications, additions and substitutions are possible, without departing from the scope and spirit of an inventive concept as disclosed in the accompanying claims.

Accordingly, the scope of the present disclosure is not construed as being limited to the described exemplary embodiments, but is defined by the appended claims as well as equivalents thereto.

What is claimed is:

1. An electronic apparatus, comprising:
   a display;
   a bezel configured to house the display and comprises a groove;
   an image sensor configured to acquire an image of a shadow which is generated in the groove by light from outside; and
   a processor configured to control the display to display a graphic effect based on the shadow image acquired by the image sensor.

2. The apparatus as claimed in claim 1, wherein the groove comprises a bottom surface and a plurality of side surfaces,
   wherein the bottom surface has a semi-transparent film, and wherein, in response to the light being incident on at least one of the plurality of side surfaces, a shadow of the at least one side is generated on the semi-transparent film of the bottom surface.

3. The apparatus as claimed in claim 2, wherein the image sensor acquires the shadow of the at least one side surface which is generated on the semi-transparent film of the bottom surface as the shadow image.

4. The apparatus as claimed in claim 1, wherein the processor determines at least one of a direction of the light, an intensity of the light, a direction of the shadow, and a length of the shadow, based on the shadow image acquired by the image sensor.

5. The apparatus as claimed in claim 4, wherein the processor determines a contrast of the light by determining a grayscale average value of pixels around right, left, upper and lower boundaries of the image based on the shadow image acquired by the image sensor.

6. The apparatus as claimed in claim 4, wherein the processor controls the display to display a shadow effect on an edge corresponding to a direction in which the light is incident from among edges of the display based on at least one of the direction of the light, the intensity of the light, the direction of the shadow, and the length of the shadow.

7. The apparatus as claimed in claim 1, wherein the groove comprises a pattern with an embossed part.

8. The apparatus as claimed in claim 1, further comprising:
a light guide plate,
wherein the image sensor is spaced apart and is not parallel to the groove and the light guide plate is spaced apart and is parallel to the groove such that the light received in the groove is incident on the image sensor through the light guide plate.

9. The display apparatus as claimed in claim 1, wherein the groove is disposed in a depth direction of the bezel and the image sensor is positioned in a rear part of the bezel.

10. A display method of an electronic apparatus, comprising:

acquiring, by an image sensor, a shadow image which is generated by light incident on a groove in a bezel which houses a display of the electronic apparatus; and displaying, by a display, a graphic effect based on the acquired shadow image.

11. The method as claimed in claim 10, wherein the groove comprises a bottom surface and a plurality of side surfaces,
wherein the bottom surface has a semi-transparent film, and
wherein, in response to the light being incident on at least one of the plurality of side surfaces, generating by a processor, on the semi-transparent film, a shadow of the at least one side.

12. The method as claimed in claim 11, wherein the acquiring comprises acquiring the generated shadow, by the image sensor, as the shadow image.

13. The method as claimed in claim 10, further comprising:
determining, by a processor, a direction of the light, an intensity of the light, a direction of the shadow, and a length of the shadow, based on the acquired shadow image.

14. The method as claimed in claim 13, wherein the determining, by the processor, comprises determining a contrast of the light by determining a grayscale average value of pixels around right, left, upper, and lower boundaries of the image based on the acquired shadow image.

15. The method as claimed in claim 13, wherein the displaying by the display, comprises displaying a shadow effect on an edge corresponding to a direction in which the light is incident from among edges of the display based on at least one of the direction of the light, the intensity of the light, the direction of the shadow, and the length of the shadow.

16. The method as claimed in claim 10, wherein the groove comprises a pattern with an embossed part.

* * * * *